(12) United States Patent
Kamiyama (10) Patent No.: US 8,007,665 B2
(45) Date of Patent: Aug. 30, 2011

(54) ADVANCED WASTEWATER TREATMENT DEVICE HAVING MOVABLE DIVIDERS

(75) Inventor: Takao Kamiyama, Hiratsuka (JP)

(73) Assignee: Sis Eng Co., Ltd., Eumseung-Kun, Chungcheongbuk-Do (KR)

( * ) Notice: Subject to any disclaimer, the term of this patent is extended or adjusted under 35 U.S.C. 154(b) by 0 days.

(21) Appl. No.: 13/050,860

(22) Filed: Mar. 17, 2011

(65) Prior Publication Data

US 2011/0168617 A1 Jul. 14, 2011

Related U.S. Application Data

(63) Continuation of application No. PCT/KR2010/002777, filed on Apr. 30, 2010.

(30) Foreign Application Priority Data

May 4, 2009 (KR) .................. 10-2009-0038992
Nov. 20, 2009 (KR) .................. 10-2009-0112824

(51) Int. Cl.
*B01D 17/12* (2006.01)
*C02F 3/30* (2006.01)

(52) U.S. Cl. ....... 210/91; 210/143; 210/151; 210/195.3; 210/220; 210/521; 210/605; 210/623

(58) Field of Classification Search .............. 210/85, 210/91, 150, 151, 195.1, 195.3, 220, 221.2, 210/521, 522, 605, 621, 623, 624, 630, 903, 210/906, 143
See application file for complete search history.

(56) References Cited

U.S. PATENT DOCUMENTS 5,234,595 A * 8/1993 DiGregorio et al. .......... 210/605
6,281,001 B1 * 8/2001 McNelly .................. 435/262
6,733,662 B2 * 5/2004 Pollock ..................... 210/97
7,195,712 B2 * 3/2007 Park et al. ................. 210/605
2002/0162795 A1 * 11/2002 Pollock .................... 210/621
2003/0024875 A1 * 2/2003 Wang ...................... 210/624
2005/0115880 A1 * 6/2005 Pollock .................... 210/194

FOREIGN PATENT DOCUMENTS

CN  1990393     *  7/2007
KR  10-0386191     6/2003
KR  2004-0000365   1/2004

OTHER PUBLICATIONS

Derwent Abstract for the Document CN 1990393, downloaded from East on May 11, 2011.*

* cited by examiner

*Primary Examiner* — Joseph W Drodge
(74) *Attorney, Agent, or Firm* — Edwards Angell Palmer & Dodge LLP; Kongsik Kim (57) ABSTRACT

Disclosed herein is an advanced wastewater treatment device. The device includes a wastewater treatment bath having an anaerobic bath in which phosphorus is discharged, an anoxic bath in which denitrification of nitrate nitrogen is performed, and an aerobic bath in which decomposition and nitrification of organic matter is performed. A first movable divider separates the anaerobic bath from the anoxic bath and is movably provided in the wastewater treatment bath to change relative volume of the anaerobic and anoxic baths. A second movable divider separates the anoxic bath from the aerobic bath and is movably provided in the wastewater treatment bath to change relative volume of the anoxic and aerobic baths. A divider moving unit moves the first and second movable dividers. An air supply unit includes air nozzles, an air pump, and valves. A recycling unit recycles activated sludge of the aerobic bath to the anoxic bath.

8 Claims, 8 Drawing Sheets

FIG. 7

ADVANCED WASTEWATER TREATMENT DEVICE HAVING MOVABLE DIVIDERS

CROSS-REFERENCE TO RELATED APPLICATION

This application is a continuation application of PCT/KR2010/002777 with the international filing date of Apr. 30, 2010, which claims under 35 U.S.C. §119(a) the benefit of Korean Application Nos. 10-2009-0038992 filed on May 4, 2009 and 10-2009-0112824 filed on Nov. 20, 2009, the entire contents of which applications are incorporated herein by reference.

BACKGROUND OF THE INVENTION

1. Field of the Invention

The present invention relates generally to advanced wastewater treatment device having movable dividers and, more particularly, to an advanced wastewater treatment device having movable dividers, which improves a biological treatment process for sewage and wastewater, thus enhancing the treatment efficiency of an A2O (Anaerobic-Anoxic-Oxic) process of an advanced wastewater treatment process and acquiring the stability of the quality of treatment water.

2. Description of the Related Art

A general sewage and wastewater treatment process is a biological process using activated sludge, in which aerobic microorganisms oxidize organic matter of sewage and wastewater under aerobic condition, thus reducing the concentration of organic matter in treatment water. A settling tank is operated to maintain the concentration of microorganisms in a reaction bath, and to prevent the discharge of particles and activated sludge to treatment water.

However, the standard activated sludge process varies in settleability depending on conditions such as the temperature, pH, or the concentration of contaminants in influent water, so that the final quality of the treatment water is greatly changed. If the activated sludge is included in the final treatment water by the deterioration of settleability, the concentration of organic matter becomes undesirably high because of the discharged activated sludge.

Further, the general standard activated sludge process may treat only carbon-based organic matter, but may not treat nitrogen or phosphorus that causes the eutrophication of rivers or lakes. In order to satisfy the effluent standard of wastewater treatment facilities which has been made more strict, a variety of processes have been proposed.

The most general and universal method of treating nitrogen or phosphorus is an A2O process, in which microorganisms undergo multi-stage processes having anaerobic, anoxic, and aerobic conditions, thus treating organic matter and nutrient salts of influent sewage and wastewater. Under anaerobic condition, the microorganisms discharge phosphorus. As the microorganisms grow under aerobic conditions, the luxury uptake of the discharged phosphorus occurs, so that the phosphorus is removed when the sludge is carried out.

Under aerobic condition, as described above, the growth of the microorganisms, the luxury uptake of the phosphorus and the oxidation of the microorganisms occur. Simultaneously, nitrogen is converted from ammonia through nitrite ($NO_2^-$) to nitrate ($NO_3^-$). The nitrogen converted in this way flows into an anoxic bath through internal return, so that it is changed into nitrogen gas ($N_2$) under anoxic condition and released into the atmosphere.

Most biological processes of removing nitrogen and phosphorus are based on the A2O process. However, the existing A2O process has a drawback in that, if each reaction bath is built at the time of designing the process, a residence time for treatment is fixed regardless of changes in properties of influent water.

The properties and temperature of wastewater vary greatly according to the season. In Korea, for example, where there are four distinct seasons and the amount of water used and water temperature varies according to which time of the year it is, treatment efficiency differs for the same microorganism concentration and residence time.

However, a change in the properties of raw water resulting from seasonal variation maintains a predetermined pattern. Water temperature, for example, as well as the amount of water used, show predictable changes depending on the season. A change in the concentration of raw water thus follows a predetermined pattern.

Therefore, a change in residence time of the biological treatment process depending on a change in properties of raw water may be predicted through a model.

SUMMARY OF THE INVENTION

Accordingly, the present invention has been made keeping in mind the above problems occurring in the prior art, and an object of the present invention is to provide an advanced wastewater treatment device having movable dividers, which overcomes the drawback of an existing A2O (Anaerobic-Anoxic-Oxic) process, that is, the fixed size of a reaction bath, thus actively coping with a change in concentration of raw water and always keeping the concentration of treatment water constant, therefore realizing the stabilization of treatment efficiency.

In order to accomplish the above object, the present invention provides an advanced wastewater treatment device having movable dividers, including a wastewater treatment bath, a first movable divider, a second movable divider, a divider moving unit, an air supply unit and a recycling unit. The wastewater treatment bath includes an anaerobic bath in which phosphorus fed from raw water is discharged, an anoxic bath in which denitrification of nitrate nitrogen returning from the aerobic bath is performed under a condition that air is not supplied, and an aerobic bath in which decomposition and nitrification of organic matter is performed. The first movable divider separates the anaerobic bath from the anoxic bath, and is movably provided in the wastewater treatment bath to change relative volume of the anaerobic bath and the anoxic bath. The second movable divider separates the anoxic bath from the aerobic bath, and is movably provided in the wastewater treatment bath to change relative volume of the anoxic bath and the aerobic bath. The divider moving unit functions to move the first and second movable dividers. The air supply unit includes a plurality of air nozzles for supplying air to the aerobic bath, an air pump for supplying air to the air nozzles, and valves for selectively closing the air nozzles coupled to the air pump. The recycling unit functions to recycle activated sludge of the aerobic bath to the anoxic bath.

The divider moving unit may include a guide rail provided on an upper portion of the wastewater treatment bath and movably supporting the first and second movable dividers, first and second motors rotatable in opposite directions and provided on the upper portion of the wastewater treatment bath, a first screw member coupling the first motor with the first movable divider and rotated when the first motor is driven, thus moving the first movable divider, and a second screw member coupling the second motor with the second movable divider and rotated when the second motor is driven, thus moving the second movable divider.

The air supply unit may include a plurality of air nozzles provided on a bottom in the wastewater treatment bath and supplying air to the aerobic bath, an air pump forcibly supplying air to the air nozzles, and a plurality of valves independently controlling supply of air from the air pump to the air nozzles.

The advanced wastewater treatment device may further include a contact sensor detecting a position of the second movable divider, and a control unit independently controlling the valves based on detected data transmitted from the contact sensor, the control unit controlling on/off operation of the valves such that air is supplied only through air nozzles located in the aerobic bath, as the second movable divider is moved.

The contact sensor may include a first contact sensor provided on each of the air nozzles to detect a contact of a lower end of the second movable divider, and a second contact sensor provided in the wastewater treatment bath and coming into direct contact with a side surface of the second movable divider, thus detecting the position of the second movable divider.

Further, a plate made of an elastic material may be provided on the lower end of the second movable divider, thus preventing air from flowing from the aerobic bath through a gap between the second movable divider and the bottom of the wastewater treatment bath to the anoxic bath.

The advanced wastewater treatment device may further include a nozzle moving unit for moving the air nozzles in the wastewater treatment bath as the second movable divider is moved.

The advanced wastewater treatment device may further include a height adjusting unit for adjusting a height of each of the first and second movable dividers from the bottom in the wastewater treatment bath.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Hereinafter, advanced wastewater treatment devices having movable dividers according to the embodiments of the present invention will be described in detail with reference to the accompanying drawings.

Figure 1:
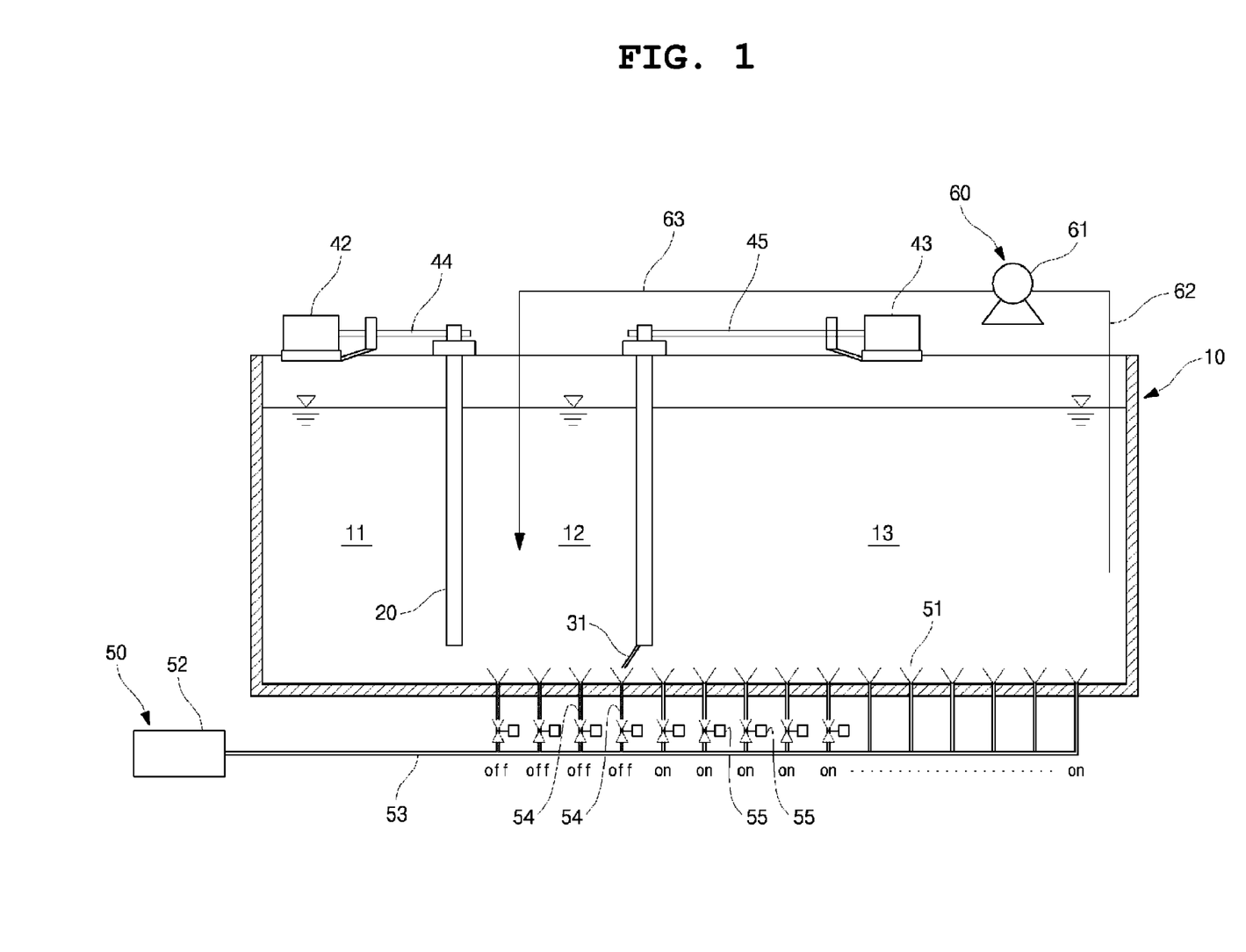
FIGS. 1 and 2 are conceptual views illustrating the operation of an advanced wastewater treatment device having movable dividers according to a first embodiment of the present invention.
Figure 2:
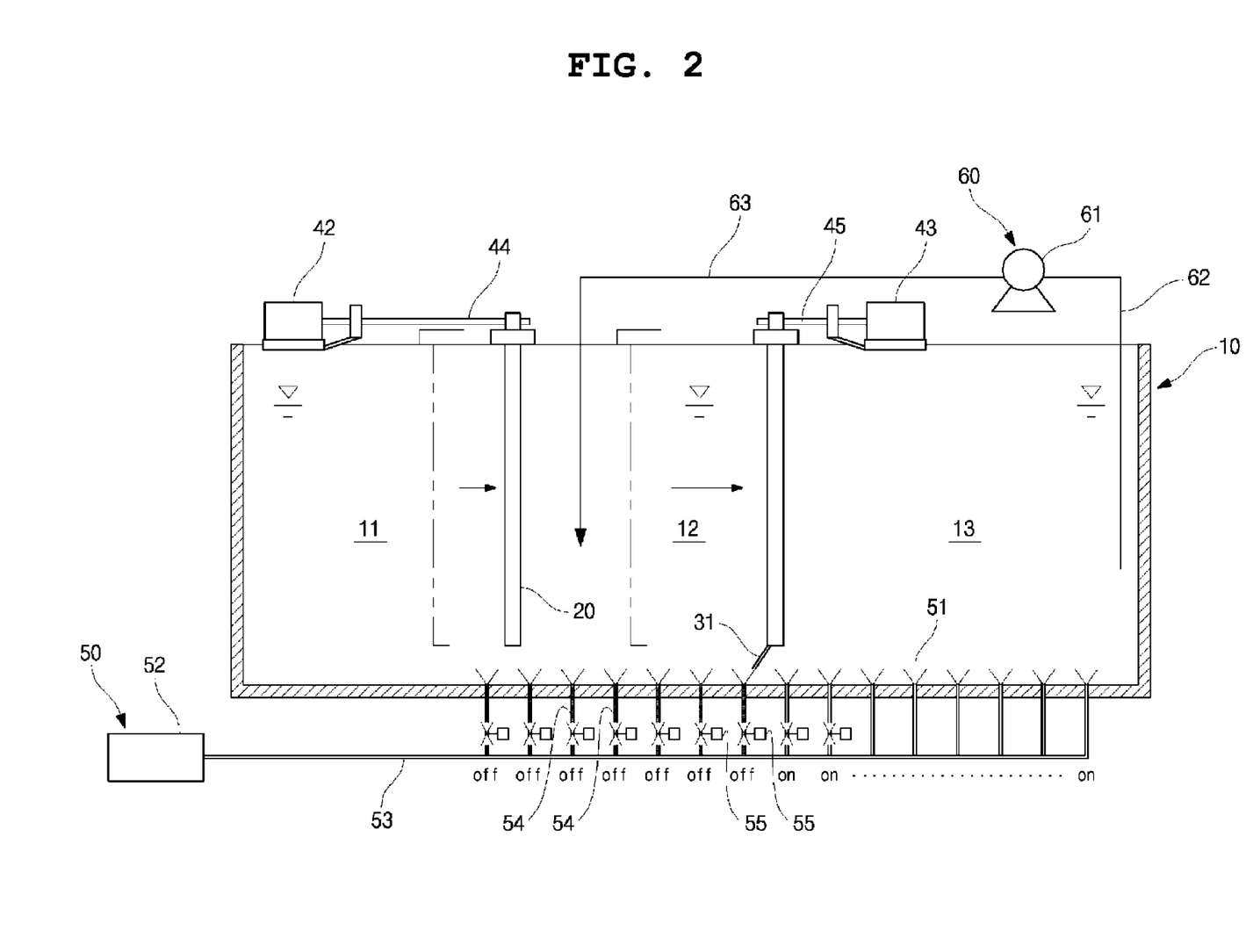
Figure 3:
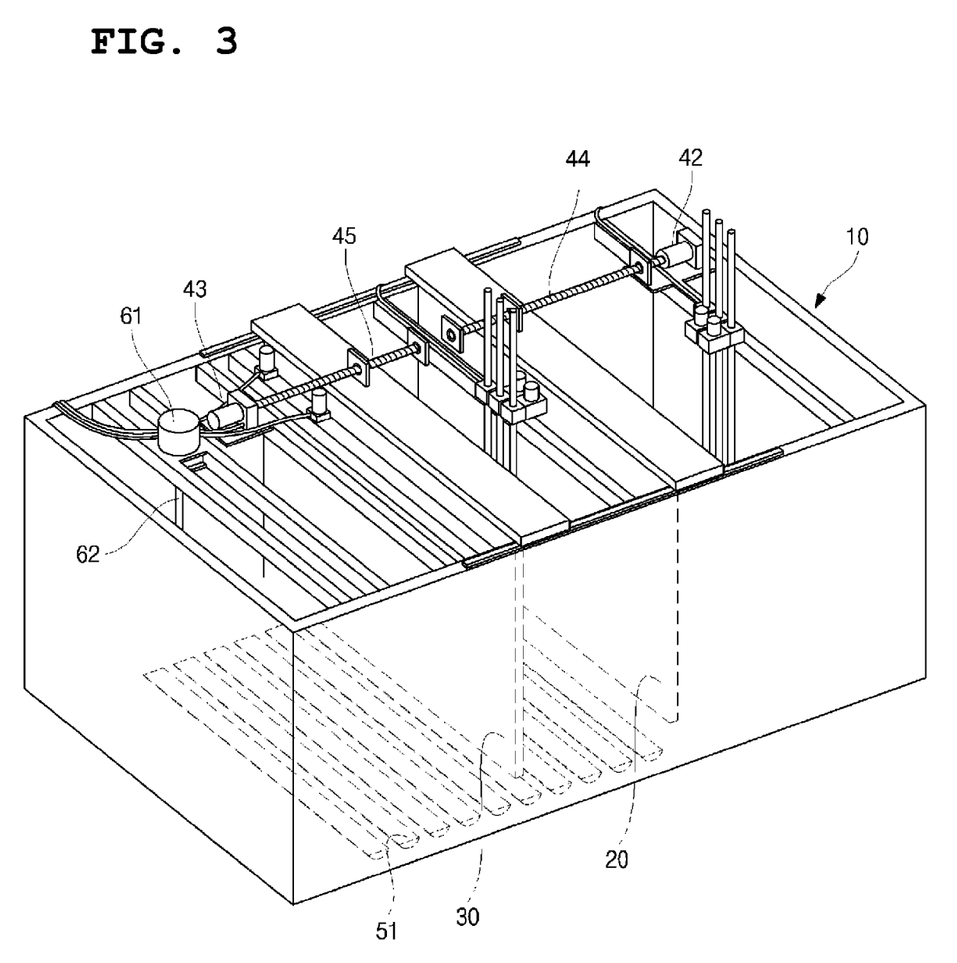
FIG. 3 is a schematic perspective view illustrating the advanced wastewater treatment device having the movable dividers according to the first embodiment of the present invention.

FIG. 1 is a view illustrating an advanced wastewater treatment device having movable dividers according to the first embodiment of the present invention, wherein the movable dividers are moved to expand a reaction bath, namely, a nitrification bath in the winter time (low water temperature). FIG. 2 is a view illustrating the method of changing the size of reaction baths including an aerobic bath (nitrification bath), an anoxic bath and an anaerobic bath when necessary.

Referring to FIGS. 1, 2, 3, 4, and 5, the advanced wastewater treatment device having the movable dividers according to the first embodiment of the present invention includes a wastewater treatment bath 10, a first movable divider 20, a second movable divider 30, a divider moving unit 40, an air supply unit 50, a recycling unit 60, and a control unit 70.

As shown in FIGS. 1 and 2, the wastewater treatment bath 10 includes an anaerobic bath 11, an anoxic bath 12 and an aerobic bath 13 which are arranged sequentially in a direction from the left to the right. In the anaerobic bath 11, phosphorus is discharged from raw water. In the aerobic bath 13, the decomposition and nitrification of organic matter occurs. Further, in the anoxic bath 12, the denitrification of nitrate nitrogen fed from the aerobic bath 13 by internal return occurs under the condition that air is not supplied. The removal of organic matter and nutrient salts is identical with the reaction of a general advanced wastewater treatment process.

The first movable divider 20 functions to separate the anaerobic bath 11 from the anoxic bath 12, and is installed in such a way as to reciprocate and adjust the treatment volumes of the anaerobic bath 11 and the anoxic bath 12 variably when necessary. That is, the first movable divider 20 is reciprocated by the divider moving unit 40.

The lower end of the first movable divider 20 is spaced apart from the bottom of the wastewater treatment bath 10 by a predetermined interval for the mobility of the first movable divider 20, because air is not supplied to both the anaerobic bath 11 and the anoxic bath 12.

The second movable divider 30 functions to separate the anoxic bath 12 from the aerobic bath 13, and is movably installed to adjust the treatment volumes of the anoxic bath 12 and the aerobic bath 13 variably when necessary.

The lower end of the second movable divider 30 is spaced apart from the bottom of the wastewater treatment bath 10 by a predetermined gap for the mobility of the second movable divider 30. In order to prevent air supplied to the aerobic bath 13 from flowing through the gap into the anoxic bath 12, an elastic plate 31 extends from the second movable divider 30, thus preventing air from flowing through a gap under the second movable divider 30 into the anoxic bath 12.

The first movable divider 20 and the second movable divider 30 are individually controlled by the divider moving unit 40 to be independently moved.

The divider moving unit 40 functions to independently move the first movable divider 20 and the second movable divider 30, and includes guide rails 41 mounted to the upper end of the wastewater treatment bath 10, a first motor 42, a second motor 43, a first screw member 44 and a second screw member 45.

The first and second movable dividers 20 and 30 constructed as described above may be made of plastic, metal, or non-ferrous metal.

The guide rails 41 are mounted to the upper end of the wastewater treatment bath 10, and movably support the first and second movable dividers 20 and 30. Thus, even though the first and second movable dividers 20 and 30 have large loads, the first and second movable dividers 20 and 30 may move naturally along the guide rails 41 and may be easily driven even by small power.

The first motor 42 is installed in the upper portion of the wastewater treatment bath 10, and is connected to the first screw member 44, thus rotating the first screw member 44 and variably moving the first movable divider 20. The first screw member 44 is fastened to the first movable divider 20, thus moving the first movable divider 20 leftwards or rightwards according to the rotating direction or the rpm of the first motor 42. The first motor 42 may be a spindle motor which is driven forward or backward by the control unit 70. When the rpm of the first motor is precisely controlled in response to the drive control signal of the control unit 70, the moving distance of the first movable divider 20 is precisely controlled, thus precisely controlling the volumes of the anaerobic bath 11 and the anoxic bath 12.

The second motor 43 is installed separately from the first motor 42 to be independently driven. The second motor 43 is installed in the upper position of the wastewater treatment bath 10, and is connected to rotate the second screw member 45 forward or backward. The second screw member 45 is connected to the second motor 43, and is screwed to the second movable divider 30. Thus, the second movable divider 30 is moved leftwards or rightwards by a predetermined distance according to the rotating direction or rpm of the second motor 43. The second motor 43 may also be a spindle motor which is rotatable in opposite directions, and the rpm of the second motor 43 is precisely controlled by the control unit 70.

Preferably, the first and second motors 42 and 43 are supported by support brackets which are additionally provided on the upper portion of the wastewater treatment bath 10.

The air supply unit 50 is provided under the wastewater treatment bath 10 to supply air into the aerobic bath 13. Such an air supply unit 50 includes a plurality of air nozzles 51 which are provided on the bottom in the wastewater treatment bath 10, an air pump 52 which supplies air into the air nozzles 51, and a plurality of valves 55 which are installed, respectively, at a plurality of branches 54 extending from a pipe 53 coupling the air pump 52 with the plurality of air nozzles 51.

According to this embodiment of the present invention, the air nozzles 51 are provided on the bottoms of the anoxic bath 12 and aerobic bath 13 at regular intervals. Preferably, the valves 55 may be installed at only the branches 54 which are connected to the air nozzles 51 which are located within the moving range of the second movable divider 30. That is, since it is not necessary to prevent air from being supplied through the air nozzles 51 which are always located in the aerobic bath 13 regardless of the moving range of the second movable divider 30, it is not necessary to install the valves 55 at the air nozzles 51 which are always located in the aerobic bath 13.

According to this construction, since air must be supplied to the aerobic bath 13 and not to the anoxic bath 12 and the anaerobic bath 11, the on/off operation of the valves 55 must be controlled according to the position of the second movable divider 30. That is, at the position of the second movable divider 30 shown in FIG. 1, the air supply to the air nozzles 51 which are located on the right side of the second movable divider 30 must be performed, while the air supply to the air nozzles 51 which are located on the left side of the second movable divider 30 must be blocked. The valves 55 located on the right side of the second movable divider 30 are on and open, while the valves 55 located on the left side of the second movable divider 30 are off and closed. The on/off operation of the valves 55 is controlled in response to the control signal of the control unit 70.

Subsequently, when the second movable divider 30 is moved to the position of FIG. 2, air must be supplied to the air nozzles 51 located on the right side of the second movable divider 30, so that the valves 51 are controlled to be on and open. Meanwhile, the air supply to the air nozzles 51 located on the left side of the second movable divider 30 must be blocked, so that the valves 51 are controlled to be off and closed.

Figure 4:
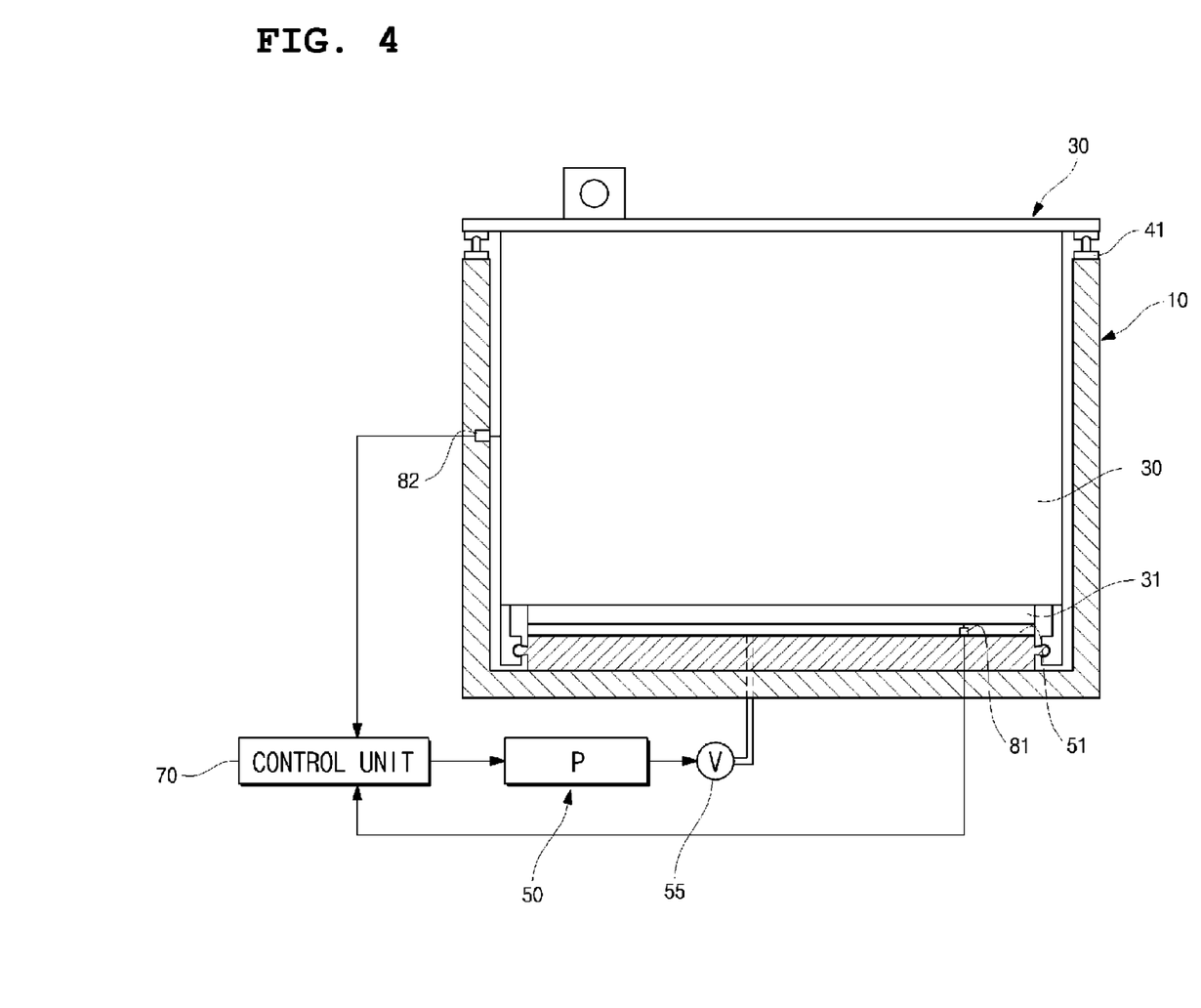
FIG. 4 is a vertical sectional view illustrating the advanced wastewater treatment device having the movable dividers of FIG. 3.
Figure 5:
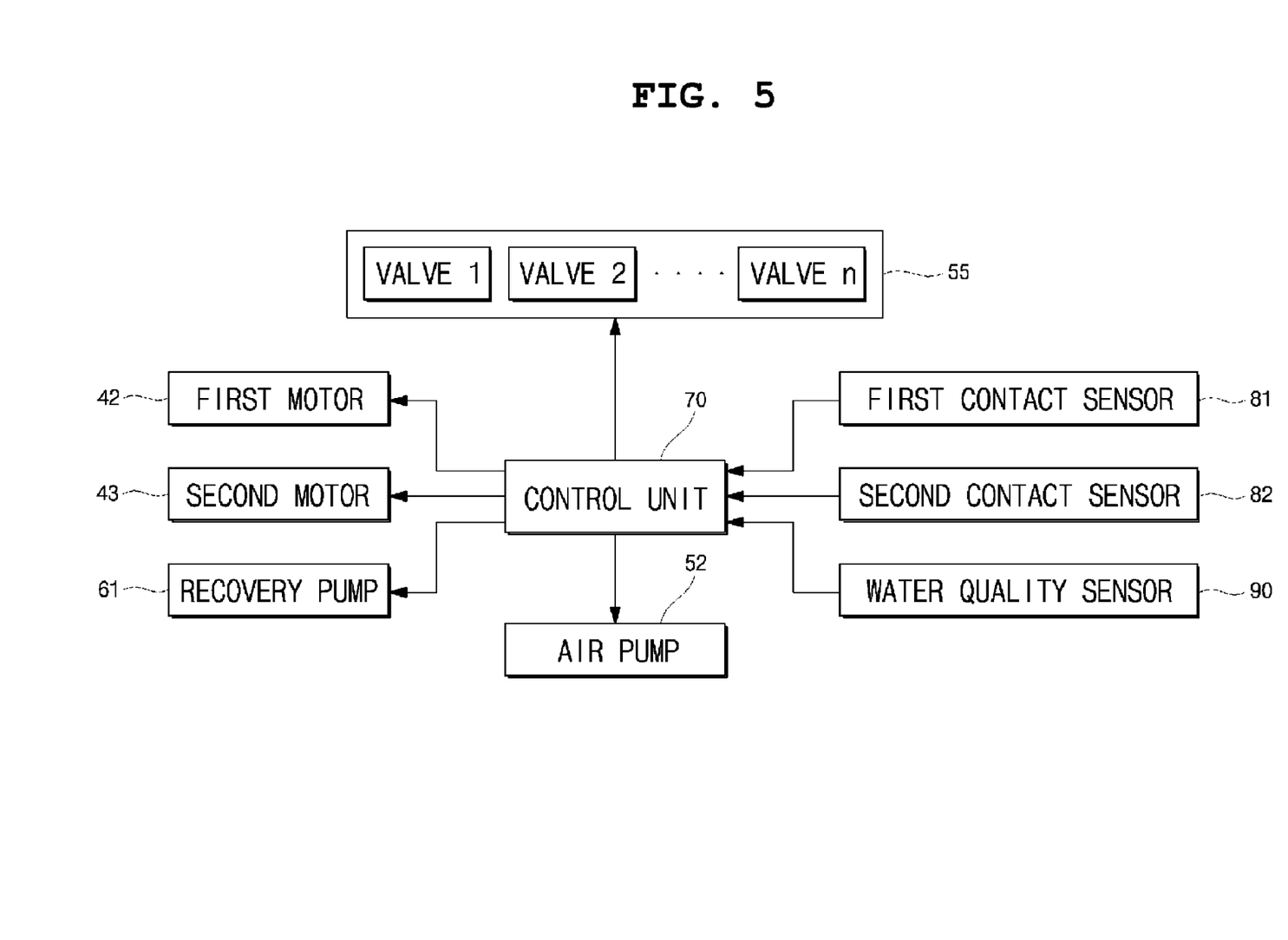
FIG. 5 is a block diagram illustrating the advanced wastewater treatment device having the movable dividers according to the first embodiment of the present invention.

Meanwhile, in order to selectively control the on/off operation of the valves 55 according to the position of the second movable divider 30, the position of the second movable divider 30 must be precisely detected. As shown in FIG. 4, for example, a first contact sensor 81 may be provided on each air nozzle 51 to detect the contact of the plate 31 which is provided on the lower portion of the second movable divider 30. Preferably, the first contact sensors 81 are installed at all the air nozzles 51. It is more preferable that the first contact sensors 81 be installed at air nozzles 51 equipped with the valves 55. The first contact sensor 81 installed at any one of the air nozzles 51 detects the contact of the plate 31 when the second movable divider 30 moves and this data is transmitted to the control unit 70. The control unit 70 then allows a user to see that the second movable divider 30 is located at a position corresponding to the first contact sensor 81 which is now in contact with the plate 31. Thereby, the control unit 70 works in such a way that valves 55 located on the right side of the associated position are on and open, and valves 55 located on the left side of the associate position are off and closed.

More preferably, as shown in FIG. 4, a second contact sensor 82 may be further provided on the inner wall of the wastewater treatment bath 10. Here, a plurality of second contact sensors 82 may be installed at regular intervals along the horizontal moving distance of the second movable divider 30. An associated second contact sensor 82 is in direct contact with the sidewall of the second movable divider 30 according to the moving position of the second movable divider 30, thus directly obtaining the positional data of the second movable divider 30. The data detected by the second contact sensor 82 is transmitted to the control unit 70. The control unit 70 selectively controls the on/off operation of the plurality of valves 55 based on the positional data of the second movable divider 30, which is transmitted to the control unit 70, thus allowing air to be supplied to only the aerobic bath 13 and preventing air from being supplied to the remaining space, that is, the anoxic bath 12 and the anaerobic bath 11.

Further, the recycling unit 60 collects sewage nitrified in the aerobic bath 13 in the anoxic bath 12 so that nitrate nitrogen undergoes the denitrification process under the condition that air is not supplied, thus allowing nitrogen of the sewage to be more efficiently treated. The recycling unit 60 includes a recovery pump 61 which is provided above or below the wastewater treatment bath 10, a recovery path 62 which couples the recovery pump 61 with the aerobic bath 13, and a supply path 63 which couples the recovery pump 61 with the anoxic bath 12. The operation of the recovery pump 61 is controlled by the control unit 70. The recovery pump 61 may be installed above or below the wastewater treatment bath 10 in such a way as to be supported by an additional support bracket. The recovery path 62 preferably comprises a pipe which extends vertically to the lower portion of the aerobic bath 13, and the supply path 63 preferably comprises a hose which is connected to the recovery pump 61 and extends to the interior of the anoxic bath 13. Since the supply path 63 comprises a flexible hose, it can be freely transformed when the second movable divider 30 is moved, so that the movement of the second movable divider 30 is not limited, and the damage to the supply path 63 is prevented.

Further, a water quality sensor 90 may be provided on the upper portion of the wastewater treatment bath 10. The water quality sensor 90 extends into the aerobic bath 13, thus sensing the quality of wastewater in the aerobic bath 13. According to the treated state of wastewater which is sensed by the water quality sensor 90, the control unit 70 controls the operation of the recycling unit 60, and besides, appropriately controls the operation of the air supply unit 50 and the first and second movable dividers 20 and 30, thus allowing sewage to be more efficiently treated.

That is, by moving the first and second movable dividers 20 and 30 provided between the reaction baths, the volume of each reaction bath can be adjusted. Thus, a reaction time (treatment time) may be changed according to the characteristics of raw water. The movable dividers 20 and 30 are moved as follows according to the changes in the characteristics of raw water. When the concentration of ammonia nitrogen in effluent water is high according to the monitored quality of raw water and final treatment water, the second movable divider 30 is moved leftward to increase the size of the aerobic bath 13 and the reaction time of the nitrification process. Meanwhile, in the case where the concentration of nitrate nitrogen in effluent water is high, the second movable divider 30 is moved rightward, thus increasing the size of the anoxic bath 12.

Figure 6:
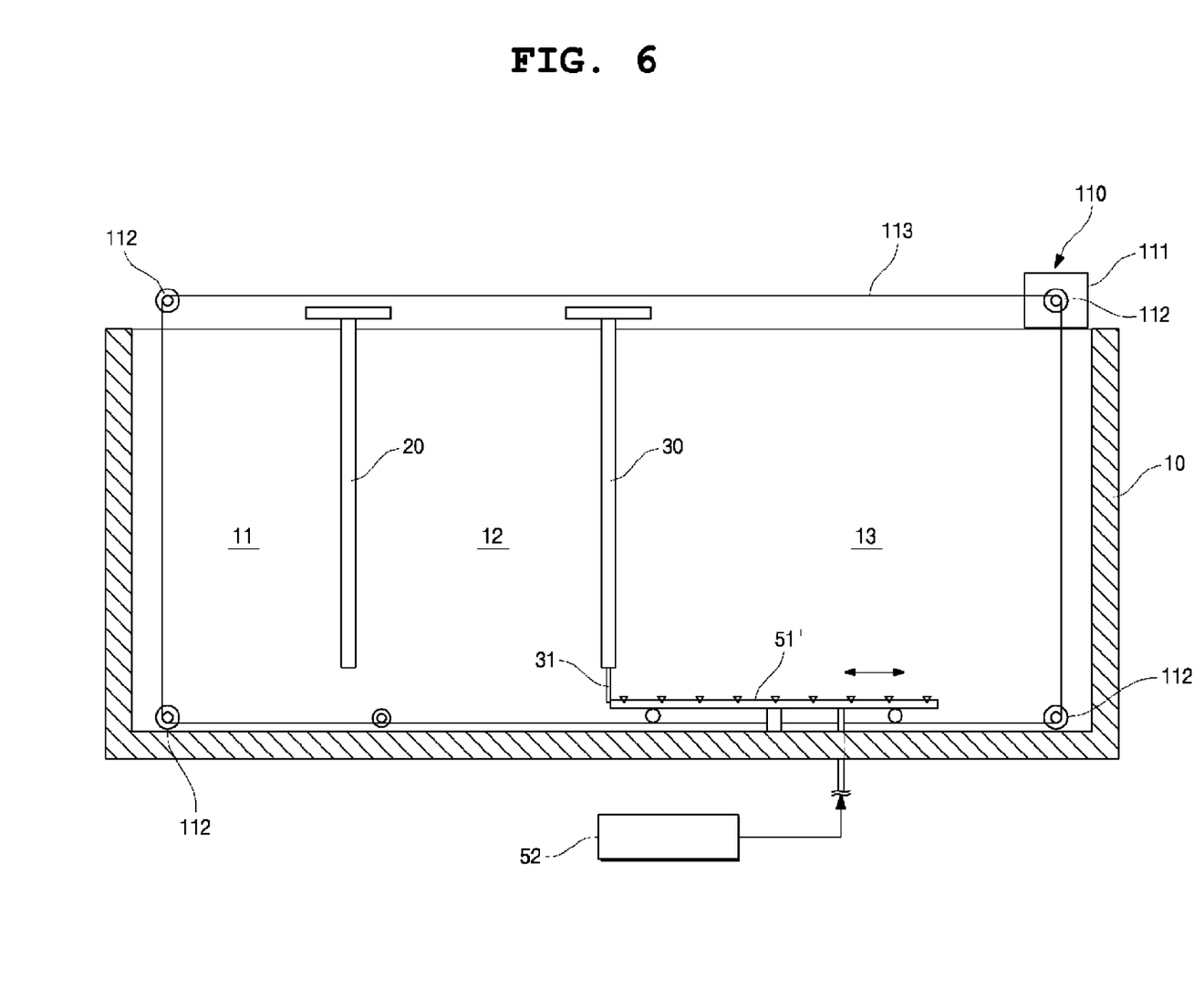
FIGS. 6 and 7 are views illustrating an advanced wastewater treatment device having movable dividers according to a second embodiment of the present invention.
Figure 7:
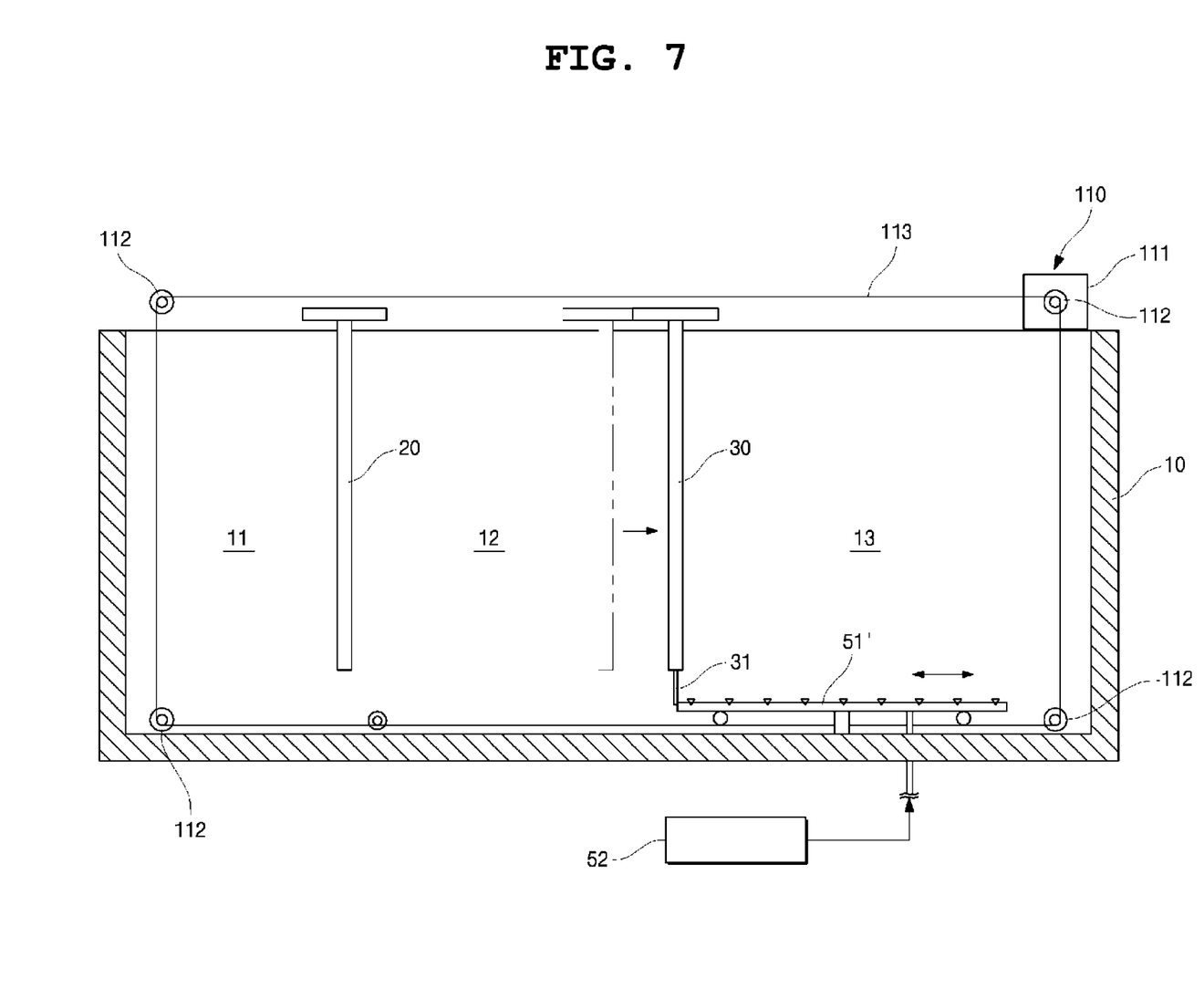

Further, according to the second embodiment of the present invention, as shown in FIGS. 6 and 7, air nozzles 51' may be installed in such a way as to move leftward and rightward along the lower surface of the wastewater treatment bath 10. Thus, as the second movable divider 30 is displaced, the air nozzles 51' are also moved so that air is supplied only to the aerobic bath 13 and not to the anoxic bath 12 and the anaerobic bath 11. In this case, a nozzle moving unit 110 is further provided to move the air nozzles 51'. As one example, the nozzle moving unit 110 includes a pair of drive motors 111, a pair of support pulleys 112, and a moving wire 113. The drive motors 111 are installed in the wastewater treatment bath 10, and the support pulleys 112 are provided on the upper portion and the bottom of the wastewater treatment bath 10 to movably support the moving wire 113 and are rotatably installed. Any one of the support pulleys 112 is connected to be rotated in a direction or an opposite direction by the drive motor 111. Any one portion of the moving wire 113 is connected to the air nozzles 51', so that the air nozzles 51' are also moved in conjunction with the moving wire 113 when it is moved. Such a construction allows the position of the air nozzles 51' to be adjusted according to the rotating direction and rpm of the drive motors 111.

The control unit 70 controls the operation of the drive motors 111 based on the data detecting the displacement of the second movable divider 30, so that the air nozzles 51' are also moved to correspond to the displacement of the second movable divider 30.

In this case, it is not necessary to install valves for controlling the air supply to the air nozzles 51'. Only the on/off operation of the air pump 52 is controlled.

Figure 8:
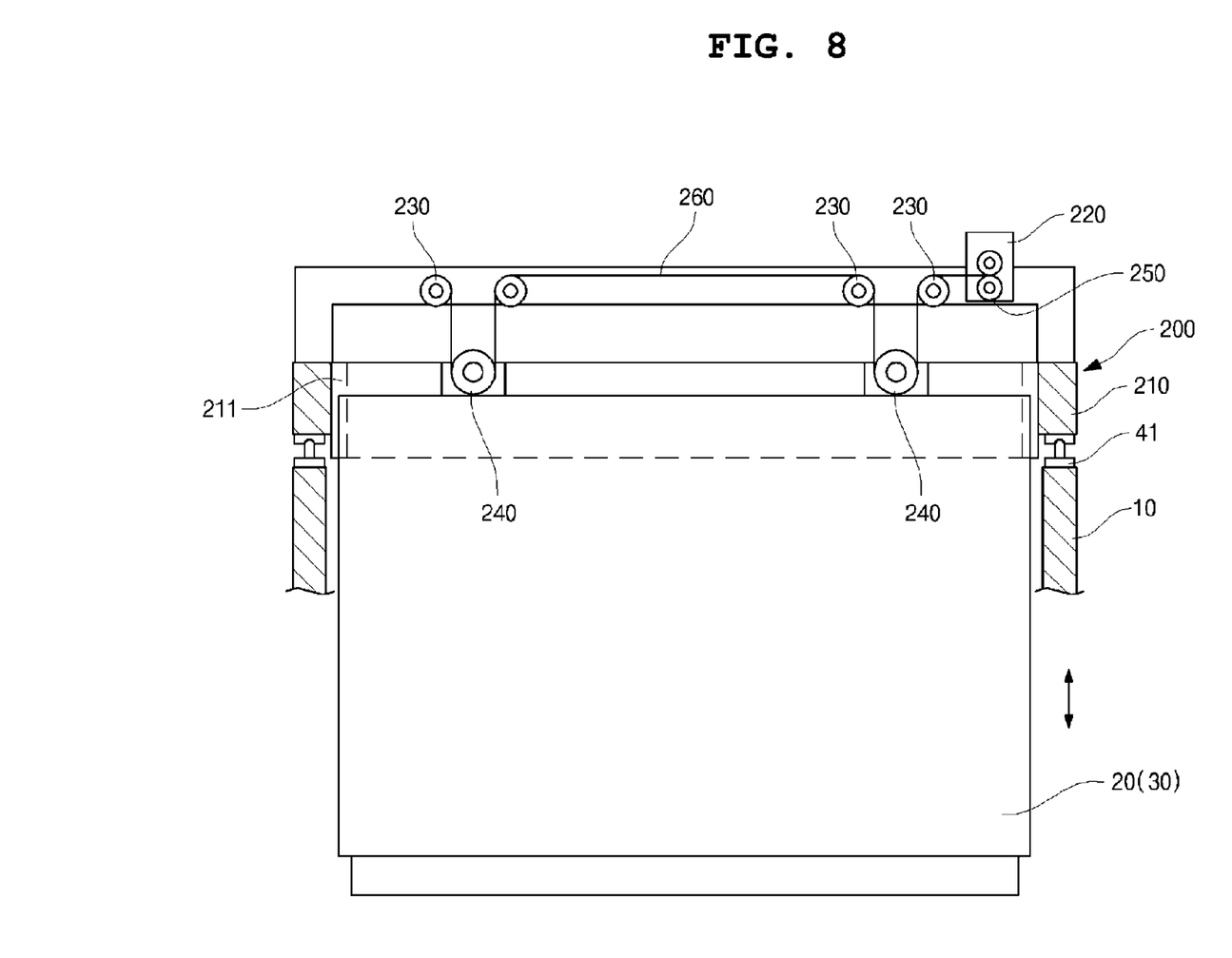
FIG. 8 is a view illustrating an advanced wastewater treatment device having movable dividers according to a third embodiment of the present invention.

Referring to FIG. 8, an advanced wastewater treatment device according to the third embodiment of the present invention further includes a height adjusting unit 200 which adjusts the vertical height of each of the first and second movable dividers 20 and 30. The height adjusting unit 200 functions to adjust the vertical height of the first and second movable dividers 20 and 30, that is, the distance between each of the first and second movable dividers 20 and 30 and the bottom of the wastewater treatment bath 10.

The height adjusting unit 200 includes a support block 210 which is supported in such a way as to move along the guide rails 41 provided on the upper portion of the wastewater treatment bath 10. A height adjusting drive motor 220 is installed at the support block 210. A plurality of first support rollers 230 is provided on the support block 210. One or more second support rollers 240 are provided on the movable dividers 20 and 30. A winding roller 250 is provided on the support block 210 and rotated by the drive motor 220. The height adjusting unit 200 also includes a support wire 260.

A guide groove 211 is formed in the central portion of the support block 210 such that the first or second movable divider 20 or 30 is coupled to the guide groove 211 in such a way as to move vertically. Since the guide rails 41 support the opposite ends of the support block 210, the support block may be moved by the moving unit 40.

The support wire 260 passes over the first and second support rollers 230 and 240. One end of the support wire 260 is secured to the first support roller 230 provided on the left of FIG. 7, while the other end is connected in such a way as to be wound around or unwound from the winding roller 250 provided on the right of FIG. 8. The winding roller 250 is connected to the drive motor 220 and is rotated in conjunction with the drive motor 220 according to its driving direction or rpm to wind or unwind the support wire 260. If the support wire 260 is wound, the first or second movable divider 20 or 30 moves upward. Conversely, if the support wire 260 is unwound, the first or second movable divider 20 or 30 moves downward. Such a construction allows the first or second movable divider 20 or 30 to be installed in the wastewater treatment bath 10 such that the height of the first or second movable divider 20 or 30, that is, a gap between the first or second movable divider 20 or 30 and the bottom of the wastewater treatment bath 10 or the air nozzles, is precisely maintained.

As described above, the present invention provides an advanced wastewater treatment device having movable dividers, in which first and second movable dividers are movably installed to vary the volume of each reaction bath (anaerobic bath, anoxic bath, or aerobic bath), thus acquiring a reaction time corresponding to the change in characteristics (water temperature, pH, and the concentration of organic matter and nutrient salts, etc.) of raw water flowing into a wastewater treatment plant, unlike a conventional fixed wastewater treatment process.

Therefore, although the characteristics of raw water flowing into the wastewater treatment device are changed, a desired level of treatment water can always be obtained.

Particularly, as the volume of an aerobic bath is changed, the position of air nozzles for supplying air to the aerobic bath or the on/off operation of the nozzles is selectively controlled, so that air is supplied only to the aerobic bath and not to other reaction baths, thus effectively treating the wastewater.

Further, a necessary amount of air is supplied according to the change in volume of the aerobic bath, thus minimizing energy consumption for the air supply and realizing economic efficiency in operation.

The present invention also provides an advanced wastewater treatment device having movable dividers with a construction for adjusting the height of the first and second movable dividers. It thus allows equipment to be installed precisely at a design position at the time of setting the equipment and enables the position of the equipment to be corrected whenever it is used, thus always permitting the treatment of sewage under an optimum condition.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. An advanced wastewater treatment device having movable dividers, comprising:
a wastewater treatment bath comprising:
an anaerobic bath in which phosphorus fed from raw water is discharged;
an anoxic bath in which denitrification of nitrate nitrogen returning from the aerobic bath is performed under a condition that air is not supplied; and
an aerobic bath in which decomposition and nitrification of organic matter is performed;
a first movable divider separating the anaerobic bath from the anoxic bath, and movably provided in the wastewater treatment bath to change relative volume of the anaerobic bath and the anoxic bath;
a second movable divider separating the anoxic bath from the aerobic bath, and movably provided in the wastewater treatment bath to change relative volume of the anoxic bath and the aerobic bath;
a divider moving unit for moving the first and second movable dividers;
an air supply unit supplying air to the aerobic bath and comprising:
a plurality of air nozzles provided from a bottom of the aerobic bath to a bottom of the anoxic bath;
an air pump forcibly supplying air to the air nozzles; and
a plurality of valves provided to correspond to the air nozzles, respectively, thus independently controlling supply of air from the air pump to each of the air nozzles;
a recycling unit for recycling activated sludge of the aerobic bath to the anoxic bath;
at least one contact sensor detecting a position of the second movable divider; and
a control unit determining the position of the second movable divider based on detected data transmitted from the contact sensor, and providing a control signal to selectively control on/off operation of respective ones of the valves dependent upon the detecting resulting in only the valves which correspond to the air nozzles located in the aerobic bath divided from the anoxic bath by the second movable divider being open, thus supplying air only through the air nozzles located in the aerobic bath.

2. The advanced wastewater treatment device as set forth in claim 1, wherein the divider moving unit comprises:
a guide rail provided on an upper portion of the wastewater treatment bath, and movably supporting the first and second movable dividers;
first and second motors rotatable in opposite directions, and provided on the upper portion of the wastewater treatment bath;
a first screw member coupling the first motor with the first movable divider, and rotated when the first motor is driven, thus moving the first movable divider; and
a second screw member coupling the second motor with the second movable divider, and rotated when the second motor is driven, thus moving the second movable divider.

3. The advanced wastewater treatment device as set forth in claim 2, wherein a plate made of an elastic material is provided on the lower end of the second movable divider, thus preventing air from flowing from the aerobic bath through a gap between the second movable divider and the bottom of the wastewater treatment bath to the anoxic bath.

4. The advanced wastewater treatment device as set forth in claim 2, further comprising:
a height adjusting unit for adjusting a height of each of the first and second movable dividers from the bottom in the wastewater treatment bath.

5. The advanced wastewater treatment device as set forth in claim 1, wherein the contact sensor comprises:
a first contact sensor provided on each of the air nozzles to detect a contact of a lower end of the second movable divider; and
at least one second contact sensor provided in the wastewater treatment bath, and coming into direct contact with a side surface of the second movable divider, thus detecting the position of the second movable divider.

6. The advanced wastewater treatment device as set forth in claim 1, wherein a plate made of an elastic material is provided on the lower end of the second movable divider, thus preventing air from flowing from the aerobic bath through a gap between the second movable divider and the bottom of the wastewater treatment bath to the anoxic bath.

7. The advanced wastewater treatment device as set forth in claim 1, further comprising:
a nozzle moving unit for moving the air nozzles in the wastewater treatment bath as the second movable divider is moved.

8. The advanced wastewater treatment device as set forth in claim 1, further comprising:
a height adjusting unit for adjusting a height of each of the first and second movable dividers from the bottom in the wastewater treatment bath.

* * * * *